United States Patent
Broms et al.

[11] 3,928,794
[45] Dec. 23, 1975

[54] INVERTER

[75] Inventors: Anders Broms; Kjell Frank, both of Vasteras, Sweden

[73] Assignee: Allmanna Svenska Elektriska Aktiebolaget, Vasteras, Sweden

[22] Filed: Oct. 25, 1974

[21] Appl. No.: 518,148

[30] Foreign Application Priority Data
Nov. 26, 1973  Sweden.............................. 7315941

[52] U.S. Cl. ................................. 321/5; 321/45 C
[51] Int. Cl.² ........................................ H02M 7/00
[58] Field of Search............................ 321/2, 5, 45 C

[56] References Cited
UNITED STATES PATENTS

| | | | |
|---|---|---|---|
| 3,315,145 | 4/1967 | Menard............................ | 321/45 C |
| 3,701,939 | 10/1972 | Petersen et al. ............. | 321/45 C X |
| 3,703,676 | 11/1972 | Frank........................... | 321/45 C X |
| 3,705,341 | 12/1972 | Frank........................... | 321/45 C X |
| 3,710,215 | 1/1973 | Johnston............................. | 321/5 X |
| 3,872,372 | 3/1975 | Kautz et al....................... | 321/45 C |

*Primary Examiner*—William M. Shoop

[57] ABSTRACT

In an inverter with a plurality of connection groups, each of which includes positive and negative points of connection for connection to a feeding direct current voltage source and an alternating current terminal, controllable main rectifiers are connected between the positive point of connection and the alternating current terminal and between the alternating current terminal and the negative point of connection, with a commutating capacitor having one terminal connected to the alternating current terminal. There are a second positive and a second negative point of connection connected to a commutating direct voltage source, with controllable commutating rectifiers connected between the second positive point of connection and the second terminal of the commutating capacitor and between the second terminal of the capacitor and the second negative point of connection. Two pairs of windings are provided which are magnetically coupled to each other. One pair of windings has a winding connected between the first rectifier and the alternating current terminal and the second winding in series with the first commutating rectifier. The second pair of windings has one winding connected between the alternating current terminal and the second main rectifier and the second in series with the second commutating rectifier. A feedback valve has its anode connected to a point between the second main rectifier and the first winding of the second pair and its cathode connected to the first positive point of connection; and a second feedback valve has its anode connected to the first negative point of connection and its cathode to a point between the first main rectifier and the first winding of the first pair of windings.

6 Claims, 4 Drawing Figures

INVERTER

BACKGROUND OF THE INVENTION

1. Field of the Invention

The present invention relates to an inverter of the type having positive and negative points of connection for connection to a feeding direct voltage current, controllable rectifiers between such points of connection and an alternating current terminal, and other controllable commutating rectifiers connected between positive and negative points of connection for a commutating direction voltage source and the terminals of commutating capacitors.

2. The Prior Art

Such inverters are known from U.S. Pat. No. 3,705,341.

The invention aims at providing an inverter of this type, in which, on the one hand, the main rectifiers are subjected to lower voltage stresses and, on the other, the time derivative of the commutating current at the beginning of a commutation is higher than in previously known inverters of the same type. Accordingly, in an inverter according to the invention the main rectifiers as well as the commutating circuit can be given smaller dimensions, which, especially for high power inverters, involves essential advantages with regard to cost of manufacture, dimensions and losses.

SUMMARY OF THE INVENTION

According to the invention, an inverter of the type described above is provided with first and second pairs of windings, the windings of each pair being magnetically coupled to each other.

The first winding of each of the pairs is connected between one of the main rectifiers and the alternating current terminals and the second winding is connected in series with one of two commutating rectifiers. A feedback valve has its anode connected to a point between the second main rectifier and the first winding of the second pair and its cathode to the positive point of connection, and a second feedback valve has its anode connected to the first negative point of connection and its cathode to a point between the main rectifier and the first winding of the first pair.

BRIEF DESCRIPTION OF THE DRAWINGS

The invention will be described more fully with reference to the accompanying drawings, in which.

DESCRIPTION OF THE PREFERRED EMBODIMENTS

Figure 1:
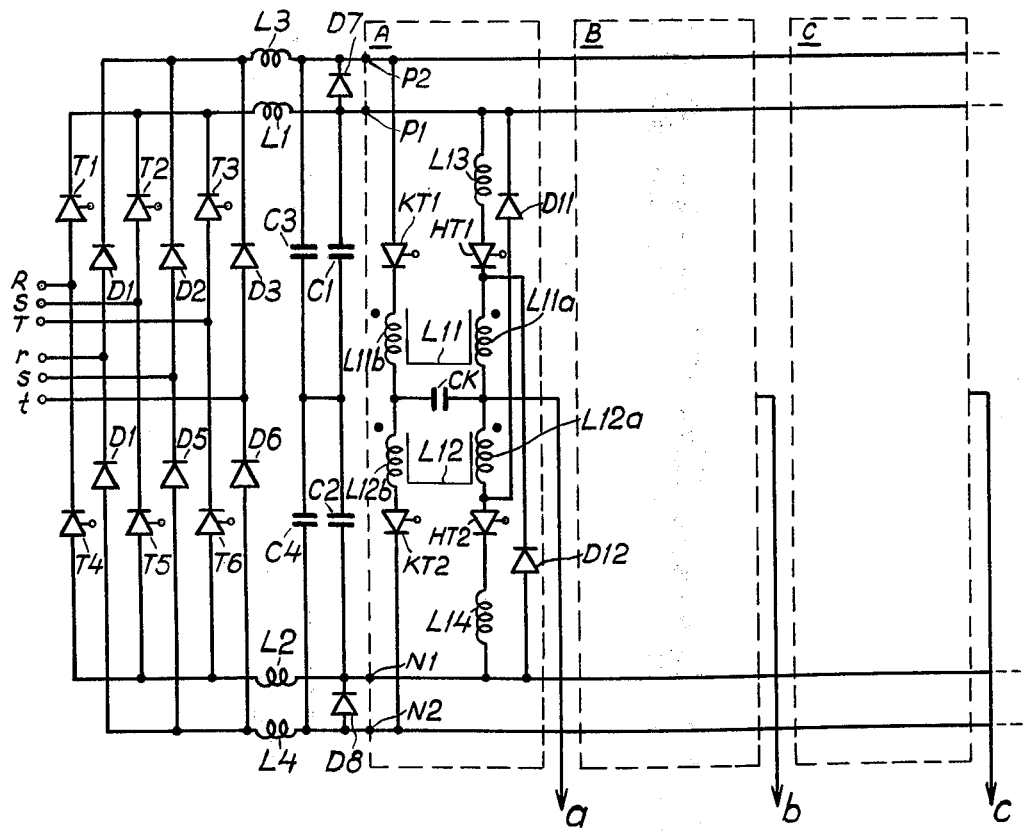
FIG. 1 shows the main circuits of an inverter according to the invention and, FIG. 2 shows the time progress of the control signals to the thyristors in the inverter.

FIG. 1 shows the main circuits of an inverter comprising three similar connection groups A, B and C, of which only group A is shown in detail. The connection groups are provided with outputs $a$, $b$ and $c$ for connection to a three-phase alternating current load (or three single-phase such loads), directly or by way of filter circuits. To its output each connection group delivers a square wave alternating voltage with a duration of 180° on each halfwave. The three groups work with a mutual phase displacement of 120°, the three output alternating voltages thus forming a symmetrical three-phase system. The inverter can be driven with a variable voltage and variable frequency and, for example, be used for feeding an alternating current motor, the speed of which can then be controlled by controlling the working frequency of the inverter.

The inverter is provided with a first positive and a first negative connection point, P1 and N1, respectively, for connection to a feeding direct voltage source, and with a second positive and a second negative connection point P2 and N2, respectively, for connection to a commutating direct voltage source.

FIG. 1 shows an example of an embodiment of these two sources. The feeding direct voltage source comprises the six thyristors T1–T6 which form a three-phase bridge. The alternating current terminals R, S, T of the bridge are intended to be connected to an alternating current network. The direct voltage delivered by the bridge is smoothed with the aid of the reactors L1 and L2 and the capacitors C1 and C2. The direct voltage is controllable between zero and a maximum value by varying the control angle of the thyristors. The commutating direct voltage source includes the six diodes D1–D6 which form a three-phase bridge. The alternating current terminals $r$, $s$, $t$ of said bridge are intended to be connected to an alternating voltage network. The direct voltage delivered is smoothed with the aid of the reactors L3 and L4 and the capacitors C3 and C4.

The commutating direct voltage is chosen so that the necessary commutating ability is obtained without too great commutating losses. In order to hold down the dimensions of the auxiliary feeding source, the main feeding source, if its voltage is sufficiently high, can be connected with the auxiliary feeding source by means of diodes (D7 and D8 in FIG. 1). In the circuit according to FIG. 1 this can be achieved by supplying bridge D1–D6 through terminals $r$, $s$, $t$ with an alternating voltage which may be about 50% of the alternating voltage supplied to the bridge T1–T6 through terminals R, S, T. If the feeding direct voltage exceeds the voltage from the bridge D1–D6, the diodes D7 and D8 become conducting, the commutating direct voltage supplied to the inverter thus being equal to the feeding direct voltage. If the feeding direct voltage is lower than the voltage from the bridge D1–D6, the diodes D7 and D8 will be blocked, and the commutating direct voltage becomes equal to the direct voltage of the diode bridge.

The connection group A comprises the main thyristors HT1 and HT2, which are series-connected between the connections P1 and N1. The alternating current output $a$ is connected to the center of the series connection. The commutating thyristors KT1 and KT2 are series-connected between the connections P2 and N2. The commutating capacitor CK is connected between the centers of the two series-connections. A first reactor L11 has two galvanically separated but magnetically well-coupled windings L11$a$ and L11$b$. The winding L11$a$ is connected between the main thyristor HT1 and the alternating current output, and the winding L11$b$ is connected between the commutating thyristor KT1 and the connection point of the commutating capacitor CK. The two windings have the same number of turns, but the winding L11$a$, which is traversed by the load current of the inverter has a greater conductor area than the winding L11$b$ which is only traversed by the commutating current. A second reactor L12 is identical with L11, and its two coupled windings L12$a$ and L12$b$ are connected in a corresponding manner between the anodes of the two thyristors HT2 and KT2 and the two terminals of the capacitor CK.

The reactor L11 may have an iron core on which the windings L11a and L11b are applied. Alternatively, the reactor may consist of an air coil with the windings L11a and L11b. The same is true for the reactor L12 with the windings L12a and L12b.

Reactors L13 and L14 are connected in series with the main thyristors HT1 and HT2 for limiting the rate of change of the thyristor current.

The connection group further includes two diodes D11 and D12 which, on the one hand, limit the voltage of the commutating capacitor and, on the other, act as feed-back diodes in case of an inductive load on the alternating current side. The diode D11 has its anode connected to a point between the thyristor HT2 and the winding L12a, and its cathode to the connection point P1. The diode D12 has its anode connected to the connection point N1 and its cathode to a point between the thyristor HT1 and the winding L11a.

Figure 2:
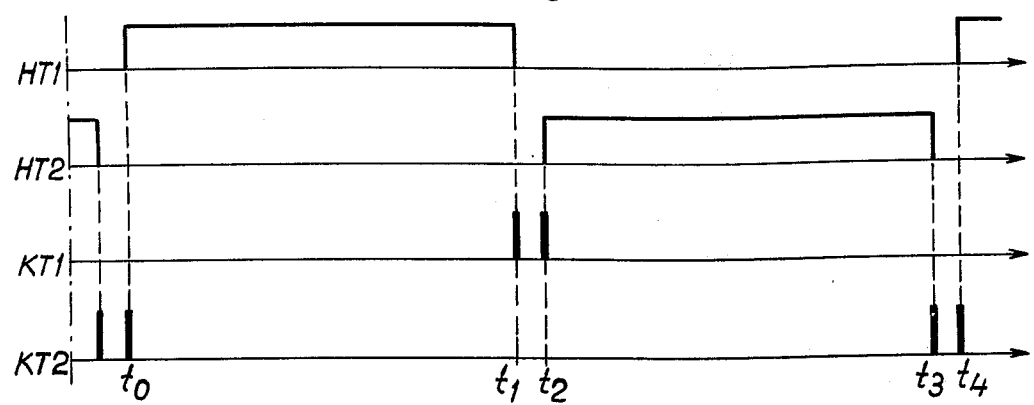

The inverter is provided with a control device, the function of which is clear from FIG. 2 showing the control signals to each of the four thyristors as a function of time. The main thyristors HT1 and HT2 each work during a half-cycle of the output voltage. In order to make sure, for example in case of an inductive load, that the main thyristor which is to be conducting can start carrying current at any time during the half-cycle, this thyristor is supplied with a control signal during the entire half-cycle, except for the time required for the commutation. At $t_0$ in FIG. 2 HT1 is given a control signal, and this thyristor then starts carrying current as soon as it receives voltage in the conducting direction. At $t_1$ the control signals cease and at the same time a short control pulse is given to the commutating thyristor KT1, the main thyristor HT1 then being extinguished. As soon as the main thyristor is able to take up blocking voltage, a control signal is delivered, at $t_2$, to the other main thyristor HT2. In order to secure, for example in case of a purely resistive load, that the commutating capacitor is charged with the right polarity and a sufficient amount of voltage for the next commutation, a further short control pulse is delivered to KT1 at $t_2$. At $t_3$ the control signal to HT2 ceases and at the same time a short control pulse is delivered to KT2, HT2 thus being extinguished. At $t_4$ a control signal is delivered to HT1 and an additional short control pulse to KT2.

Before an extinction of HT1, for example, the capacitor CK is charged with positive voltage of its right-hand plate. When KT1 is ignited, the capacitor drives a current from P2 through KT1, L11b, CK, L11a, HT1 and L13 to P1 (and a certain amount of current through L12a and D11 to P1). In the source the current is closed through D7 and/or the smoothing capacitors C1 and C3. As is clear from the polarity indications on L11a and L11b, this current does not cause any flux in L11. The rate of growth of the current is therefore not limited by this reactor, and a very fast extinction of HT1 can be obtained, involving a minimum consumption of commutating capacitor energy. The said rate of growth is kept within the limits permissible for the commutating and main thyristors by the reactor L13.

After the extinction of HT1, the current of the quenching capacitor flows only through L12a and D11 to P1. L11b and L12a now together form the inductive part of an oscillating circuit for recharging of the quenching capacitor. When, towards the end of the oscillating process, the capacitor voltage reaches the same value as the voltage between P2 and N1, D12 starts to carry current. Because L11a and L11b are magnetically coupled, a very rapid transfer of the current is made from KT1 and L11b to D12 and L11a. The charging of the commutating capacitor is thus interrupted, and the capacitor voltage is limited to a value somewhat exceeding the voltage between P2 and N1.

An inverter according to the invention can be driven as a so-called pulse inverter, that is, one in which switching of the polarity of the output voltage takes place a number of times during each half-cycle of the desired output alternating voltage. The relation between the lengths of the positive and the negative intervals is then continuously varied so that the average value of the output voltage follows a sinusoidal function with the desired frequency and amplitude.

Figure 3:
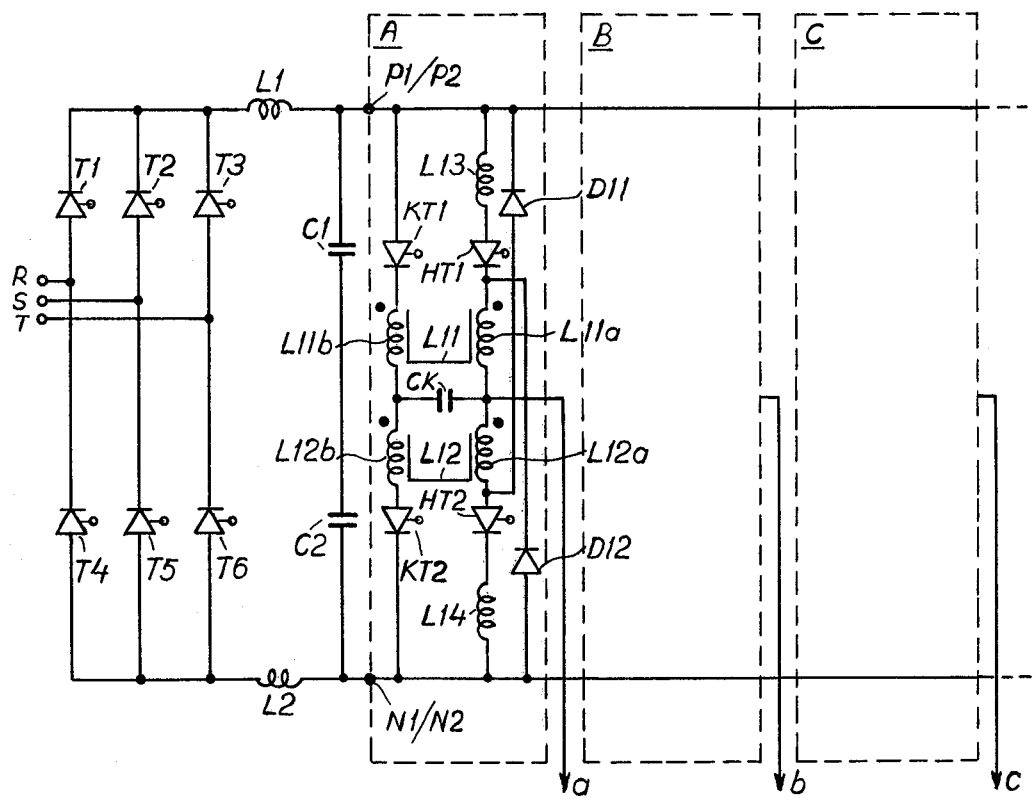
FIGS. 3 and 4 show modifications of the main circuit.

In the last-mentioned case the inverter can suitably be fed with a constant direct voltage. If this is done, or if the feeding direct voltage is only varied within a smaller range, the separate commutating direct voltage source may be unnecessary. In that case (See FIG. 3) one single feeding voltage source is arranged to which main thyristors, commutating thyristors as well as feed-back diodes are connected. In that case the first (P1) and the second (P2) positive connection points as well as the first negative (N1) and the second negative (N2) connection points coincide.

An inverter according to the invention may consist of one, two, three or more connection groups.

In FIG. 1 the feed-back valves D11 and D12 are connected to the terminal points of the windings L11a and L12a. Within the scope of the invention they may be alternatively connected at a distance from the terminal points of the said windings.

Figure 4:
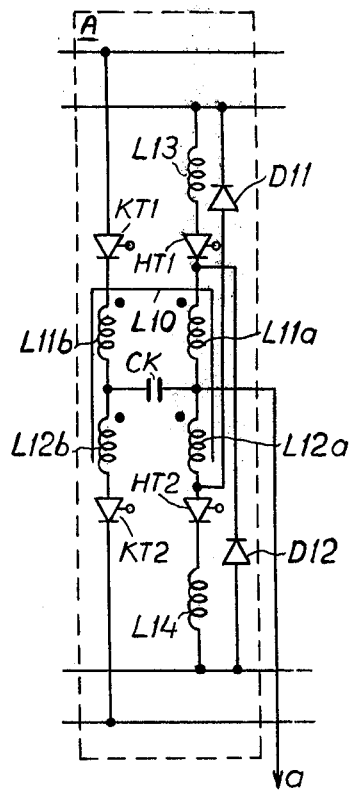

In the foregoing it has been described how the two windings in each pair of windings (L11a – L11b and L12a – L12b, respectively) are magnetically coupled to each other. According to an alternative embodiment of the invention, the windings are designed so that each of the said four windings is magnetically coupled to each of the other windings. This can be achieved by arranging all windings (L11a, L11b, L12a and L12b) on the same iron core L10 (See FIG. 4) or in the same air coil. The polarities of the windings are then to be the same as those shown in FIG. 1. In this alternative embodiment the inductance of each winding, in case of unchanged commutating ability, only has to be about half as great as in the connection shown in FIG. 1, which involves advantages with regard to price, space requirements and losses.

I claim:

1. Inverter comprising at least one connection group (A), each connection group comprising
   a. a first positive (P1) and a first negative (N1) point of connection for connection to a feeding direct voltage source (T1-T6),
   b. an alternating current terminal (a),
   c. a first controllable main rectifier (HT1) connected between said positive point of connection (P1) and the alternating current terminal (a) and a second controllable main rectifier (HT2) connected between said alternating current terminal (a) and the negative point of connection (N1),
   d. a commutating capacitor (CK), one terminal of which is connected to the alternating current terminal (a),
   e. a second positive (P2) and a second negative (N2) point of connection for connection to a commutating direct voltage source (D1–D6),
f. a first controllable commutating rectifier (KT1) connected between said second positive point of connection (P2) and the second terminal of the commutating capacitor (CK), and a second controllable commutating rectifier (KT2) connected between said second terminal of the commutating capacitor and said second negative point of connection (N2),
g. a first and a second pair of windings (L11a, L11b and L12a, L12b, respectively), each pair of windings comprising a first and a second winding, said windings being magnetically coupled to each other,
h. a first and a second feedback valve (D11,D12),
in which the first pair of windings has its first winding (L11a) connected between the first main rectifier (HT1) and the alternating current terminal (a) and its second winding (L11b) in series with the first commutating rectifier (KT1),
the second pair of windings has its first winding (L12a) connected between the alternating current terminal (a) and the second main rectifier (HT2) and its second winding (L12b) in series with the second commutating rectifier (KT2),
the first feedback valve (D11) has its anode connected to a point between the second main rectifier (HT2) and the first winding (L12a) of the second pair of windings, and its cathode connected to the first positive point of connection (P1), and that
the second feedback valve (D12) has its anode connected to the first negative point of connection (N1) and its cathode to a point between the first main rectifier (HT1) and the first winding (L11a) of the first pair of windings.

2. Inverter according to claim 1, in which the windings of the first pair of windings are arranged on a first reactor core and the windings of the second pair of windings on a second reactor core.

3. Inverter according to claim 1, in which each winding is magnetically coupled to the second winding in its own pair of windings as well as to the two windings of the second pair of windings.

4. Inverter according to claim 3, in which the windings are arranged on a common reactor core.

5. Inverter according to claim 1, in which said first and second positive points of connection (P1, P2) coincide, and that said first and second negative points of connection (N1, N2) coincide.

6. Inverter according to claim 1, in which a reactor (L13, L14) for limiting the current derivative through the rectifier is arranged in series with each main rectifier (HT1, HT2).

* * * * *